US008667151B2

(12) United States Patent
Mizikovsky et al.

(10) Patent No.: US 8,667,151 B2
(45) Date of Patent: Mar. 4, 2014

(54) BOOTSTRAPPING METHOD FOR SETTING UP A SECURITY ASSOCIATION

(75) Inventors: Semyon B. Mizikovsky, Morganville, NJ (US); Ganapathy S. Sundaram, Hillsboro, NJ (US); Zhibi Wang, Woodridge, IL (US)

(73) Assignee: Alcatel Lucent, Paris (FR)

( * ) Notice: Subject to any disclaimer, the term of this patent is extended or adjusted under 35 U.S.C. 154(b) by 293 days.

(21) Appl. No.: 11/836,313

(22) Filed: Aug. 9, 2007

(65) Prior Publication Data

US 2009/0043901 A1  Feb. 12, 2009

(51) Int. Cl.
*G06F 15/16* (2006.01)
(52) U.S. Cl.
USPC ........... 709/229; 709/206; 709/225; 713/151; 713/155; 713/171; 726/2; 726/6
(58) Field of Classification Search
USPC .......... 709/225, 227–229, 206; 713/150–151, 713/155, 171; 380/227–228, 44–45; 726/4, 726/17, 21, 2, 6
See application file for complete search history.

(56) References Cited

U.S. PATENT DOCUMENTS

| | | | |
|---|---|---|---|
| 6,584,567 B1 | 6/2003 | Bellwood et al. | 713/171 |
| 6,681,017 B1 | 1/2004 | Matias et al. | 380/277 |
| 6,769,000 B1 | 7/2004 | Akhtar et al. | |
| 6,792,534 B2 | 9/2004 | Medvinsky | 713/171 |
| 6,879,690 B2 | 4/2005 | Faccin et al. | 380/247 |
| 7,039,404 B2 * | 5/2006 | Das et al. | 455/435.1 |
| 7,188,365 B2 | 3/2007 | Balissat et al. | |
| 7,835,528 B2 * | 11/2010 | Bajko et al. | 380/283 |
| 2002/0026503 A1 | 2/2002 | Bendinelli et al. | 709/220 |
| 2002/0026531 A1 | 2/2002 | Keane et al. | 709/250 |
| 2002/0029276 A1 | 3/2002 | Bendinelli et al. | 709/227 |
| 2002/0056008 A1 | 5/2002 | Keane et al. | 709/245 |
| 2002/0069278 A1 | 6/2002 | Forslow | |
| 2002/0087643 A1 | 7/2002 | Parsons et al. | 709/206 |
| 2002/0091859 A1 | 7/2002 | Tuomenoksa et al. | 709/245 |
| 2002/0099937 A1 | 7/2002 | Tuomenoksa | 713/153 |
| 2002/0147820 A1 | 10/2002 | Yokote | |

(Continued)

FOREIGN PATENT DOCUMENTS

WO   WO 00/41427      7/2000
WO   WO2008146395 A1  12/2008

OTHER PUBLICATIONS

Narayanan et al., Establishing Handover Keys using Shared Keys, Mar. 6, 2007, IETF Mipshop Internet-Draft, 32 pages.*

(Continued)

*Primary Examiner* — Oleg Survillo
(74) *Attorney, Agent, or Firm* — Mendelsohn, Drucker & Associates, P.C.

(57) ABSTRACT

In one embodiment, a method of the invention has the steps of: (A) establishing an access-layer security association (SA) between a mobile node (MN) and an authentication authorization accounting (AAA) server; (B) deriving a secondary key from an extended master session key (EMSK) corresponding to the access-layer SA; (C) providing the secondary key to a home agent; and (D) based on the secondary key, establishing an SA corresponding to an Open System Interconnection (OSI) layer higher than the access layer for securing communications between the home agent and a selected network node. In various embodiments, the selected network node can be (i) the MN, (ii) a proxy node configured on behalf of the MN, or (iii) a proxy node configured on behalf of the home agent.

13 Claims, 3 Drawing Sheets

(56) References Cited

U.S. PATENT DOCUMENTS

| | | | |
|---|---|---|---|
| 2003/0014646 A1* | 1/2003 | Buddhikot et al. | 713/184 |
| 2003/0120733 A1 | 6/2003 | Forman | 709/206 |
| 2003/0131259 A1 | 7/2003 | Barton et al. | 713/201 |
| 2003/0147537 A1 | 8/2003 | Jing et al. | 380/277 |
| 2003/0166397 A1 | 9/2003 | Aura | |
| 2003/0191963 A1* | 10/2003 | Balissat et al. | 713/201 |
| 2004/0087304 A1 | 5/2004 | Buddhikot et al. | |
| 2004/0225895 A1* | 11/2004 | Mukherjee et al. | 713/201 |
| 2006/0090074 A1 | 4/2006 | Matoba | 713/171 |
| 2007/0022476 A1* | 1/2007 | Bae et al. | 726/15 |
| 2007/0124592 A1* | 5/2007 | Oyama | 713/171 |
| 2007/0274266 A1* | 11/2007 | Oyama et al. | 370/335 |
| 2007/0275716 A1* | 11/2007 | Lee et al. | 455/433 |
| 2008/0127317 A1* | 5/2008 | Nakhjiri | 726/6 |
| 2008/0212783 A1* | 9/2008 | Oba | 380/279 |
| 2009/0172403 A1* | 7/2009 | Liang et al. | 713/171 |
| 2011/0164498 A1* | 7/2011 | Giaretta et al. | 370/232 |

OTHER PUBLICATIONS

Salowey et al., Specification for the Derivation of Usage Specific Root Keys (USRK) from an Extended Master Session Key (EMSK), Jun. 19, 2006, IETF Network Working Group Internet-Draft, 16 pages.*

Gundavelli et al., Proxy Mobile IPv6, Jun. 18, 2007, IETF NETLMM WG Internet-Draft, 49 pages.*

Narayanan et al., Handover Keys using AAA, IETF Mipshop, Oct. 21, 2005, 31 pages.*

"A Latching MEMS Relay for DC and FR Applications," by Vivek Agrawal, Memscap Inc., Research Triangle Park, NC, USA, ISBN: 0-7803-8460-1, IEEE, Sep. 20-23, 2004, pp. 222-225.

Chinese Office Action; Mailed May 21, 2012 for the corresponding Chinese Application No. 200880102545.6.

Chinese Office Action; Mailed on Jan. 28, 2013 for the corresponding Chinese Application No. 200880102545.6.

Notice of Rejection; Mailed on Feb. 5, 2013 for the corresponding Japanese Application No. 2010-519917.

Kasera, S., et al., "On securely enabling intermediary-based services and performance enhancements for wireless mobile users", WiSe '03 proceedings of the 2nd ACM workshop on Wireless security, Sep. 19, 2003, pp. 61-68.

European Office Action; Mailed Dec. 20, 2012 for the corresponding European Application No. 08794852.7.

* cited by examiner

200

308

BOOTSTRAPPING METHOD FOR SETTING UP A SECURITY ASSOCIATION

BACKGROUND OF THE INVENTION

1. Field of the Invention

The present invention relates to networks and, more specifically, to network security.

2. Description of the Related Art

Contemporary data networking standards support security functions for communicating network nodes at practically every layer of the Open System Interconnection (OSI) stack. For example, the OSI application layer can employ Secure Real-Time Transport Protocol (SRTP) security mechanisms; the OSI transport layer can employ Secure Socket Layer (SSL) and/or Transport Layer Security (TLS) mechanisms; and the OSI network layer can employ Internet Protocol Security (IPSec) mechanisms. OSI link (or access) layer security mechanisms depend on and are specific to the employed link-layer standard and include, e.g., IEEE 802 security mechanisms, 3GPP UMTS and GSM security mechanisms, 3GPP2 Cdma2000 and UMB security mechanisms. While frame formats, protocol exchanges, and security methods (e.g., encryption and authentication) are specified in the relevant standards and publications, specific mechanisms for establishing security associations and negotiating encryption algorithms are often subject to significant implementation variations.

One representative network-layer security mechanism for securing exchanges between any two IP addressable network nodes relies on the use of IPSec procedures coupled with Internet Key Exchange (IKE, version 1 or 2) procedures. This network-layer security mechanism is used, for example, in Mobile IPv6, a popular mobility management protocol for IPv6 (Internet Protocol, version 6) enabled devices, which is described in the IETF Network Working Group's Request for Comments No. 3775 (RFC 3775), the teachings of which are incorporated herein by reference. In Mobile IPv6, control messages (referred to as binding updates and binding acknowledgements) are exchanged between a mobile end point and a home agent to enable routing and forwarding of packets to and from the mobile end point. While the option of using IPSec for securing control messages is explicitly spelled out in Mobile IPv6, specific procedures for establishing a security association and providing relevant session keys are open to development and innovation.

SUMMARY OF THE INVENTION

Embodiments of the invention provide methods for establishing secure communications between two or more network nodes. In one embodiment, a method of the invention has the steps of: (A) establishing an access-layer security association (SA) between a mobile node (MN) and an authentication authorization accounting (AAA) server; (B) deriving a secondary key from an extended master session key (EMSK) corresponding to the access-layer SA; (C) providing the secondary key to a home agent; and (D) based on the secondary key, establishing an SA corresponding to an Open System Interconnection (OSI) layer higher than the access layer for securing communications between the home agent and a selected network node. In various embodiments, the selected network node can be (i) the MN, (ii) a proxy node configured on behalf of the MN, or (iii) a proxy node configured on behalf of the home agent.

According to one embodiment, a method of the invention for establishing secure communications between two or more nodes of a network comprises the steps of: (A) establishing a first security association (SA) between a client and a network server, the first SA being an access-layer SA; (B) at each of the client and the network server, deriving a secondary key from a key corresponding to the first SA; (C) at a first network node, obtaining the secondary key from the network server; and (D) establishing a second SA between the first network node and a second network node using the secondary key, wherein the second network node possesses the secondary key.

According to another embodiment, the invention provides a node of a network that has: (A) a client; (B) a network server, wherein (i) the client and the network server are adapted to establish a first security association (SA), the first SA being an access-layer SA and (ii) each of the client and the network server is adapted to derive a secondary key from a key corresponding to the first SA; and (C) a first network node adapted to obtain the secondary key from the network server, wherein the first network node and a second network node are adapted to establish a second SA using the secondary key, wherein the second network node possesses the secondary key. The node is one of the client, the network server, the first network node, and the second network node.

According to another embodiment, a network of the invention comprises: (A) a client; (B) a network server, wherein (i) the client and the network server are adapted to establish a first security association (SA), the first SA being an access-layer SA; and (ii) each of the client and the network server is adapted to derive a secondary key from a key corresponding to the first SA; and (C) a first network node adapted to obtain the secondary key from the network server, wherein the first network node and a second network node are adapted to establish a second SA using the secondary key, wherein the second network node possesses the secondary key.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Figure 1:
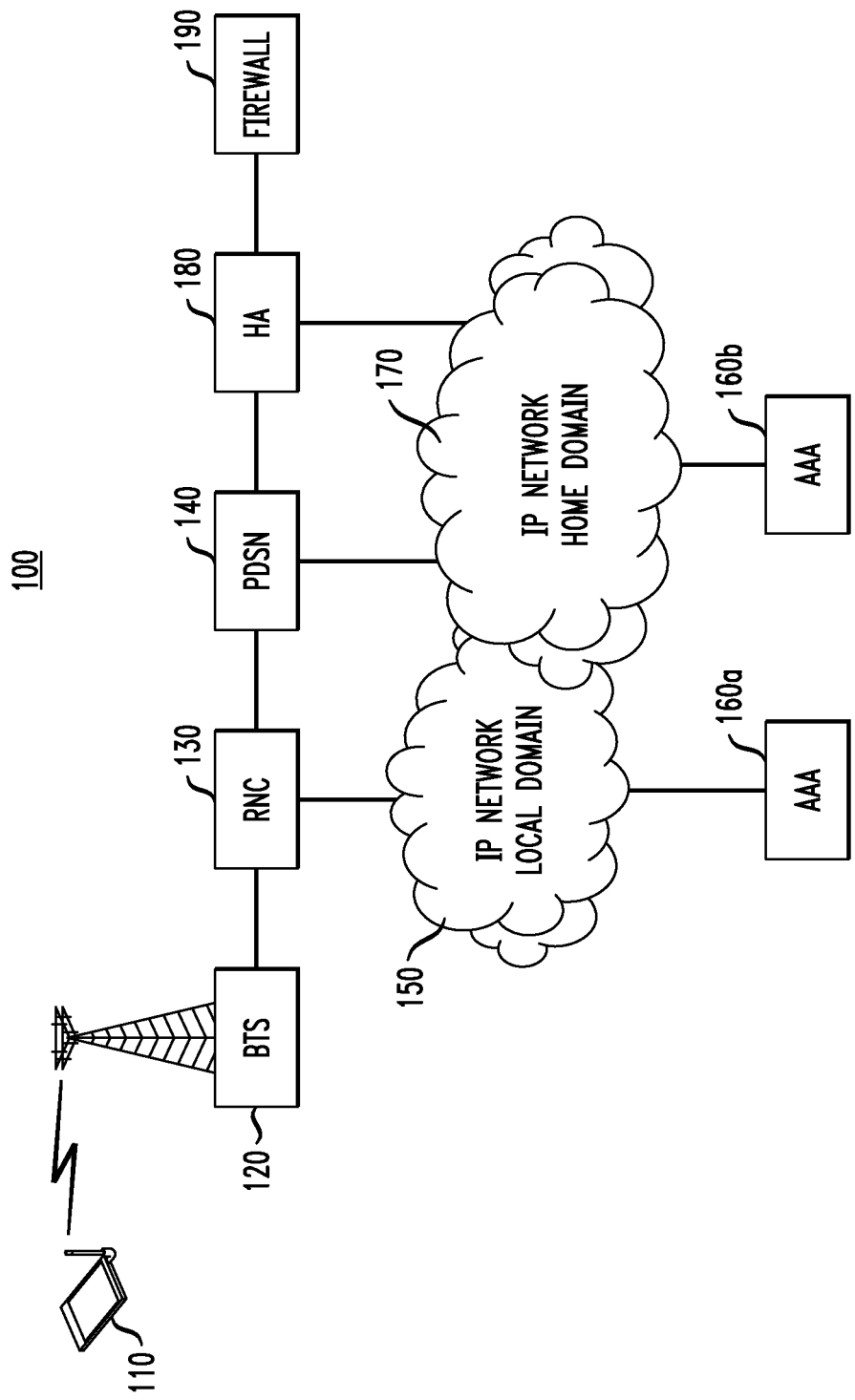
FIG. 1 shows a block diagram of a network in which methods of the invention can be practiced.

FIG. 1 shows a block diagram of a network 100 in which methods of the invention can be practiced. Network 100 is a representative network having a wireless link. One skilled in the art will appreciate that methods of the invention can also be practiced in a differently configured network having one or more wireless links and in various wire-line networks.

Network 100 has a mobile node (MN) 110, which can be, e.g., a laptop, a personal digital assistant, or a cell phone. MN 110 is connected via a wireless link to a base transceiver station (BTS) 120 that is further connected via wire-line links to other elements of network 100. Typically, BTS 120 is configured to support a wireless cell having multiple mobile nodes similar to MN 110. A radio network controller (RNC)

130 is responsible for control of BTS 120 and other base stations analogous to BTS 120 that are connected to that RNS. RNC 130 carries out radio resource management and certain mobility management functions. RNC 130 is further connected to a packet data serving node (PDSN) 140 and, via a local network domain 150, to an authentication authorization accounting (AAA) server 160a.

PDSN 140 provides access to the Internet, intranets, and applications servers for MN 110 and acts as an access gateway. For example, PDSN 140 can be configured to provide regular internet protocol (IP) access and/or mobile IP access, foreign agent support, and packet transport for virtual private networking (VPN). PDSN 140 also acts as a client for AAA servers, such as an AAA server 160b to which the PDSN is connected via a home network domain 170. PDSN 140 is further connected to a home agent (HA) 180.

Each of AAA servers 160a-b is a network server configured for access control. The authentication function of AAA server 160 identifies the user, such as MN 110. The authorization function of AAA server 160 implements policies that determine which resources and services a valid user may access. The accounting function of AAA server 160 keeps track of usage time and data-resource utilization by each user for billing and analysis.

HA 180 is a router on home network domain 170 that maintains information about the current location of MN 110, e.g., as identified in the MN's care-of address. HA 180 is configured to use tunneling mechanisms to direct traffic to and from MN 110. HA 180 may work in conjunction with a foreign agent (not explicitly shown in FIG. 1), which is a router on a corresponding foreign network domain. Further description of foreign and home agents and their functions can be found, e.g., in the Internet Engineering Task Force (IETF) RFC 3344, the teachings of which are incorporated herein by reference.

Network 100 is connected to a firewall 190, which is configured to limit, in accordance with a predefined security policy, access between network 100 and another (e.g., private corporate) network (not explicitly shown in FIG. 1). MN 110 can establish a connection with a node of the firewalled network using, e.g., appropriate VPN procedures.

A block diagram representing a UMB/CAN (Ultra Mobile Broadband/Converged Access Network) flat network architecture, in which methods of the invention can also be practiced, can be obtained from the block diagram shown in FIG. 1 by replacing PDSN 140 with an access gateway (AGW) server. In addition, RNC 130 becomes a signaling RNC. The latter is a logical network element that can be integrated with the BTS or the AGW server.

Figure 2:
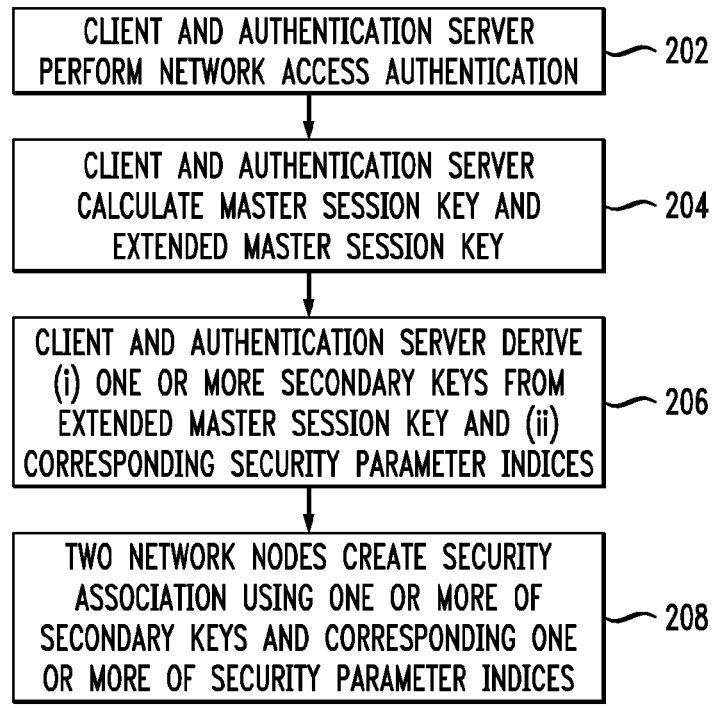
FIG. 2 shows a flowchart of a method for setting up a security association (SA) according to one embodiment of the invention.

FIG. 2 shows a flowchart of a method 200 for setting up a security association (SA) according to one embodiment of the invention. For illustration purposes, method 200 is described in reference to network 100 (FIG. 1). One skilled in the art will appreciate that method 200 can similarly be implemented in other suitable networks, e.g., a UMB/CAN network. Method 200 has general applicability and is not standard or protocol specific.

An SA is generally defined as a simplex connection between two network entities that affords security services to the traffic carried by it. To secure typical bi-directional communications, two SAs (one in each direction) are generally employed. An SA is identified by a set of SA attributes defined by the corresponding standard or protocol. One example of such a set is a triple consisting of a Security Parameter Index (SPI), an IP destination address, and a security protocol identifier. An SPI is an identification tag added to the packet header that helps the kernel discern different traffic streams. Generally speaking, an SPI is an identifier for an SA with respect to a particular security protocol, with each security protocol having its own SPI space. An IP destination address can be a unicast address, an IP broadcast address, or a multicast group address. Although, certain existing SA management mechanisms are defined only for unicast SAs, various embodiments of the bootstrapping method of the invention are generally applicable to both point-to-point and point-to-multipoint SAs. Exemplary security protocols are the Authentication Header (AH) and Encapsulating Security Payload (ESP) protocols.

At step 202 of method 200, network 100 performs network access authentication. More specifically, MN 110 (client) performs a registration procedure with network 100, e.g., after coming online. Registration procedures are generally known in the art and typically involve mutual authentication (or one-way authentication) using random numbers and shared secrets. The most common form of authentication is user name and password, although this form provides a relatively low level of security. VPNs usually use digital certificates and digital signatures to achieve a relatively high level of security. Step 202 can be carried out by one of AAA servers 160 or by RNC 130 or PDSN 140 acting as a proxy for the respective AAA server.

At step 204, MN 110 and AAA server 160 reach an access key agreement. More specifically, MN 110 and AAA server 160 independently calculate a master session key (MSK) and an extended master session key (EMSK). At this point, an access-layer SA has been created between MN 110 and AAA server 160. The MSK is shared with the network element that provides network access services to MN 110, e.g., PDSN 140. In contrast, the EMSK is known only to MN 110 and AAA server 160 and is not shared with any other network element.

At step 206, MN 110 and AAA server 160 use the EMSK to derive from it additional keying material, hereafter referred to as secondary keys. Note that secondary keys are cryptographically isolated from one another. One or more of such secondary keys may be derived. MN 110 and AAA server 160 also derive a respective SPI for each secondary key. Each such SPI is substantially a pointer to the corresponding secondary key. Methods for deriving secondary keys and SPIs are known in the art and may include, e.g., processing of a primary key material and additional known parameters with cryptographic one-way pseudo-random functions, such as HMAC-SHA1, etc. Such functions are described, e.g., in IETF RFC 2104, the teachings of which are incorporated herein by reference.

At step 208, two nodes of network 100 create an SA between them using one or more of the secondary keys and one or more of the corresponding SPIs derived at step 206. Note that those two nodes may or may not include at least one of MN 110, PDSN 140, and AAA server 160. For example, at step 208, MN 110 can create an SA with any desired device or element of network 100, e.g., HA 180. Alternatively, another network node, e.g., a proxy server (not explicitly shown in FIG. 1), acting on behalf of MN 110 can create at step 208 an SA with HA 180. The SA created at step 208 can correspond to any OSI layer higher than the access layer. Those higher layers are, in the ascending order, the network, transport, session, presentation, and application layers. In effect, two appropriately authorized network nodes bootstrap a new SA to the access-layer SA between MN 110 and AAA server 160 established at step 204.

As used herein, the term "bootstrap" generally designates a process by which network entities use an available security arrangement to establish a new security arrangement. For example, if there is an established SA between network entities A and B, then network entity C different from A or B can use that SA to establish a new SA with network entity D. Network entity D may or may not include one of network entities A and B.

Figure 3:
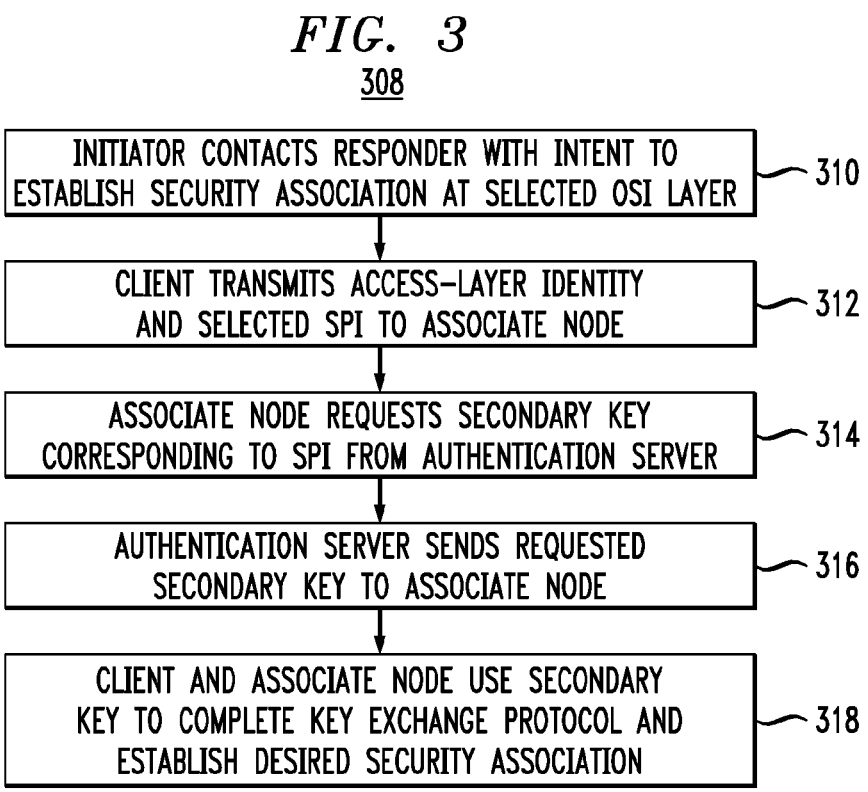
FIG. 3 shows a flowchart of a bootstrapping method that can be used in the method shown in FIG. 2 according to one embodiment of the invention.

FIG. 3 shows a flowchart of a bootstrapping method 308 that can be used to implement step 208 of method 200 according to one embodiment of the invention. For illustration purposes, method 308 is described in reference to creating an SA between MN 110 (client) and HA 180 (associate node). One skilled in the art will appreciate that an SA between other appropriate network entities can similarly be created. Method 308 can be initiated by either side. In the description below, MN 110 and HA 180 are assumed to be the initiator and responder, respectively. The opposite is also possible.

At step 310 of method 308, MN 110 (client, initiator) contacts HA 180 (associate node, responder) with intent to establish a desired security association corresponding to an appropriately selected OSI layer. Implicit to this step is the fact that MN 110 and HA 180 possess valid respective identities in that OSI layer. During a message exchange corresponding to step 310, MN 110 and HA 180 reveal those identities to each other. To secure the message exchange, MN 110 and HA 180 may establish, as known in the art, an ephemeral security association, e.g., based on an un-authenticated Diffie-Hellman procedure. In other words, this security association would be established between two communicating nodes without their prior knowledge of one-another, and thus having no ability to validate each-other's identity.

At step 312, MN 110 (client) selects an SPI pointing to a corresponding secondary key generated at step 206 of method 200. The selected SPI is then communicated to HA 180 (associate node). In addition, MN 110 informs HA 180 of its access-layer identity. Note that AAA server 160 knows the access-layer identity of MN 110. Typically, the access-layer identity of MN 110 also contains information identifying the appropriate AAA server 160.

At step 314, HA 180 (associate node) contacts the identified AAA server 160 and requests the secondary key corresponding to the SPI selected by MN 110 at step 312. Step 314 may further include the step of contacting a proxy server, which then routes the request to the appropriate AAA server 160.

At step 316, AAA server 160 processes the request and sends the requested secondary key to HA 180 (associate node). This step may include the step of transferring the requested secondary key back through the proxy server that routed the initial request for the secondary key. AAA server 160 and the proxy server may use a pre-existing SA between them or create a new SA to securely transfer the secondary key from the AAA server to the proxy server. Similarly, the proxy server and HA 180 may use a pre-existing SA or create a new SA to securely transfer the secondary key from the proxy server to the HA. The format of the exchanges between HA 180 and AAA server 160/proxy server may involve a standard format or a vendor specific extension.

At step 318, HA 180 (associate node) sends an acknowledgement to MN 110 (client) about the receipt of the secondary key. After the acknowledgement, each of MN 110 and HA 180 completes a remaining portion of the appropriate key exchange protocol (e.g., IKE) to derive from the secondary key a key for the subsequent traffic between the MN and HA. After this derivation, MN 110 and HA 180 possess an appropriate shared secret and, thus, have established the desired SA. Further traffic between MN 110 and HA 180 is transmitted using this SA.

Figure 4:
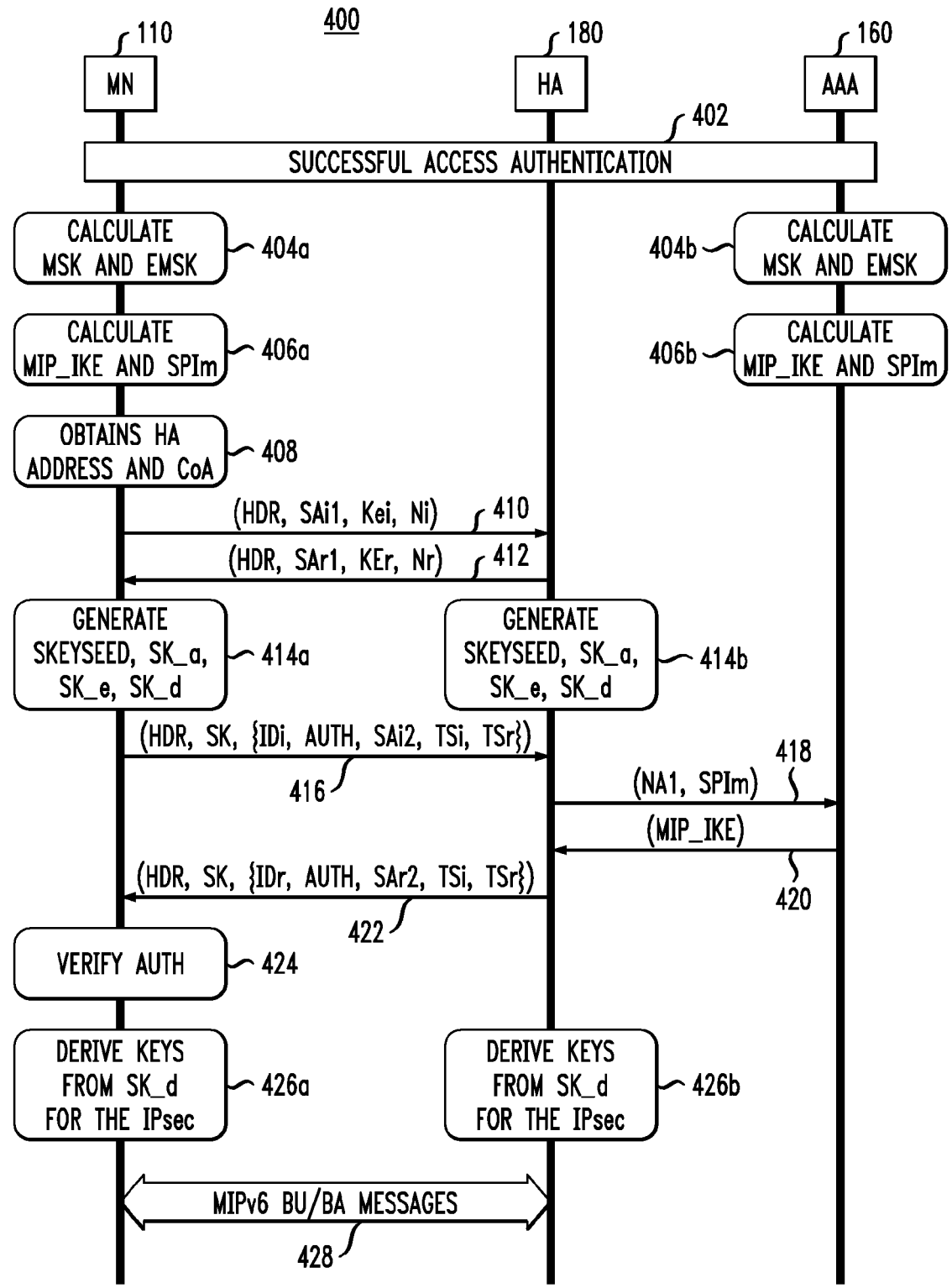
FIG. 4 shows a method for setting up an SA according to another embodiment of the invention.

FIG. 4 shows a method 400 for setting up an SA according to another embodiment of the invention. Method 400 is designed for Mobile IPv6 (MIPv6) compliant networks and can be viewed as a representative protocol-specific embodiment of generally applicable method 200. Under MIPv6, a mobile client (e.g., MN 110) computes a co-located care-of address (CoA) based on the visited network's subnet. Then, the mobile client obtains an IPv6 home address from a home agent (e.g., HA 180) and simultaneously binds the CoA and home address at the home agent. This binding procedure may be secured using an IPSec tunnel pre-established between the mobile node and the home agent. Method 400 provides a bootstrapping procedure for establishing a secure session key for an IPSec session between the mobile node and the home agent.

For illustration purposes, method 400 is described in reference to creating an SA between MN 110 and HA 180 in network 100 (see FIG. 1). One skilled in the art will appreciate that method 400 is similarly applicable to (i) the creation of an SA between two other appropriate network entities and/or (ii) other network architectures. To better explain advantages and benefits of method 400 over the corresponding prior-art methods, a brief description of a typical prior-art method for creating an SA between MN 110 and HA 180 is provided first. That description is followed by a detailed description of method 400.

A typical prior-art method for creating an SA between MN 110 and HA 180 has two phases. Phase 1 provides for mutual authentication of MN 110 and HA 180. This phase establishes what is known as an Internet Security Association Key Management Protocol (ISAKMP) SA. Phase 2 sets up the desired IPSec SA between MN 110 and HA 180.

Phase 1 negotiation can be carried out, for example, in six messages as follows. In message 1, MN 110 sends HA 180 a cookie and a list of the cryptographic algorithms that the MN supports. HA 180 replies in message 2 with a cookie of its own and a list of the cryptographic algorithms that the HA supports. Messages 3 and 4 are the Diffie-Hellman exchange. In message 5, MN 110 reveals its identity to HA 180. In message 6, HA 180 similarly reveals its identity to MN 110.

Phase 2 negotiation can be initiated by either side. For illustration purposes, MN 110 and HA 180 are assumed to be the initiator and responder, respectively. In message 1 of phase 2, MN 110 sends to HA 180 (i) the pair of cookies generated during phase 1, hereafter denoted as X, (ii) a 32-bit number, hereafter denoted as Y, that distinguishes phase 2 from phase 1, (iii) a list of proposed cryptographic parameters (PCP), (iv) a nonce, (v) a Diffie-Hellman value, and (vi) an optional description of the traffic to be sent. In message 2, HA 180 sends to MN 110 (i) X, (ii) Y, (iii) a list of accepted cryptographic parameters (ACP), (iv) the HA's SPI authenticator, (v) a respective nonce, (vi) a respective Diffie-Hellman value, and (vii) an optional description of the traffic to be sent. In message 3, MN 110 sends to HA 180 (i) X, (ii) Y, and (iii) an acknowledgement. At this point, MN 110 and HA 180 have established the desired SA and further traffic continues using that SA.

Referring now to FIG. 4, the respective vertical lines that extend down from each of MN 110, HA 180, and AAA server 160 represent increasing time. Each of the horizontal arrows that connect two respective time lines represents a respective message transmitted between the corresponding nodes. A horizontal box 402 represents an access-layer authentication procedure that generally corresponds to step 202 of method 200. A double-headed arrow 428 represents traffic that carries binding updates (BU) and binding acknowledgements (BA) between MN 110 and HA 180 after the desired SA has been established. Each of the ovals represents a respective method step.

During procedure 402, AAA server 160 executes a full Extensible Authentication Procedure (EAP) with MN 110. The EAP is described, e.g., in IETF RFC 3748, the teachings of which are incorporated herein by reference. Specific EAP methods that produce mutually authenticated security associations, i.e., generate MSK and EMSK, include, but not limited to, those described, e.g., in RFC 4187 (EAP-AKA) and RFC 2716 (EAP-TLS). AAA server 160 then checks whether MN 110 is authorized to enter into security associations to use network services. After successful access authentication and authorization, MN 110 and AAA server 160 calculate the MSK and the EMSK at steps 404a-b. At steps 406a-b, using the EMSK as a source key material, MN 110 and AAA server 160 derive an additional key, denoted herein as MIP_IKE. This additional key will be used as a root key for MIPv6 security. In addition, MN 110 and AAA server 160 derive the corresponding SPI (denoted herein as SPIm). SPIm is computed using either the EMSK or one of its direct derivatives as a source material. As a result, MIP_IKE and SPIm are directly associated while being cryptographically isolated from one another. Note that steps 404a and 406a are performed in parallel with steps 404b and 406b, respectively. Steps 404 and 406 generally correspond to steps 204 and 206, respectively, of method 200.

Messages 410, 412, and 416-422 and steps 408, 414, 424, and 426 represent a bootstrapping procedure directed at obtaining a pre-shared key for IKEv2 (IKE version 2). This bootstrapping procedure generally corresponds to step 208 of method 200.

At step 408, MN 110 obtains the IP address of HA 180 from AAA server 160, and also computes a co-located CoA based on an advertisement from the visited network gateway. The co-located CoA is the network-layer identity of MN 110. The IP address of HA 180 serves as the identity of the HA.

In message 410, MN 110 sends to HA 180 the following attributes: HDR, SAi1, Kei, and Ni. HDR contains (i) the SPI derived as a result of the EAP procedure of step 402, (ii) version numbers, and (iii) appropriate flags. In particular, HDR contains two SPI fields: (1) SPI of the initiator (MN 110), denoted as SPIi, and (2) SPI of the responder (HA 180), denoted SPIr. To prevent SPIi collision at the responder, the SPIi field contains 4 octets of SPIm, with the rest of that field filled with the co-located CoA of the MN. The SPIr field in message 410 is filled with zeros. The SAi1 payload states the cryptographic algorithms that the initiator supports for the IKE SA. The KEi payload contains the initiator's Diffie-Hellman value. Ni is the initiator's nonce.

In message 412, HA 180 (responder) sends back to MN 110 (initiator) the following attributes: HDR, SAr1, KEr, and Nr. HA 180 chooses a cryptographic suite from the SAi1 payload of message 410 and expresses that choice in the SAr1 payload of message 412. The KEr payload of message 412 completes the Diffie-Hellman exchange with MN 110. Nr is the responder's nonce. The SPIr field in the HDR of message 412 is filled with a random value, thus ensuring uniqueness of the concatenated SPIi|SPIr combination.

At steps 414a-b, MN 110 and HA 180 independently generate SKEYSEED, a key from which all keys are derived for the IKE SA. Except for the headers, the contents of messages 416 and 422 are encrypted and integrity-protected. The keys used for the encryption and integrity protection are derived from SKEYSEED and are known as SK_e (encryption) and SK_a (authentication, a.k.a. integrity protection). A separate pair of SK_e and SK_a is computed for each direction. The notation SK {payload} used for designating the contents of messages 416 and 422 indicates that the payload is encrypted and integrity protected using that direction's SK_e and SK_a.

In addition to SK_e and SK_a, another quantity (denoted as SK_d) is derived at steps 414a-b and used thereafter for the derivation of further keying material for child SAs.

In message 416, MN 110 sends to HA 180 the following attributes: HDR and SK {IDi, AUTH, SAi2, TSi, TSr}. HDR parameters are described, e.g., in section 3.1 of RFC 4306, the teachings of which are incorporated herein by reference. The IDi payload contains the MN's Network Access Identifier (NAI) to be registered. The AUTH payload is used to prove knowledge of the secret corresponding to IDi and to integrity protect the contents of message 416. The AUTH payload is signed with key MIP_IKE generated at step 406. The SAi2 payload is used to begin negotiation of a child SA. TSi and TSr are the traffic selectors for the IPsec traffic corresponding to the initiator and responder, respectively.

Upon receiving message 416 from MN 110, HA 180 first looks up its database with the CoA and SPIi in the HDR field. If no corresponding key is found in the database, then HA 180 sends message 418 containing SPIm and the MN's NAI to AAA server 160 to obtain key MIP_IKE. AAA server 160 uses the received SPIm and NAI to find key MIP_IKE, which was generated at step 406. AAA server 160 then returns MIP_IKE to HA 180 in message 420. Upon receiving MIP_IKE, HA 180 can verify AUTH. If a key corresponding to the CoA and SPIi is found in the database, then messages 418 and 420 are not sent, and HA 180 proceeds directly to trying to verify AUTH.

If the verification of AUTH is successful, then HA 180 sends to MN 110 message 422 having the following attributes: HDR and SK {IDr, AUTH, SAr2, TSi, TSr}. HDR parameters are described, e.g., in section 3.1 of RFC 4306. The IDr payload asserts the HA's identity. The AUTH payload is used to authenticate the HA's identity and protect the integrity message 422. The AUTH payload is signed with key MIP_IKE generated at step 406. TSi and TSr are used to complete the negotiation of the child SA. If the verification of AUTH is unsuccessful, then the child SA creation fails and the procedure terminates. Unsuccessful bootstrapping signifies failure of the bootstrapped link-layer SA, which might indirectly indicate that at least one of the involved entities fakes its knowledge of the bootstrapped secret and does not have a legitimate authority to be in secure communications with another entity.

At step 424, MN 110 verifies the AUTH payload of message 422 and asserts that the name in the IDr payload corresponds to the key that was used to generate the AUTH payload. Both MN 110 and HA 180 are now able to derive IPSec session keys from key SK_d (see step 414), which they do at steps 426a-b, respectively. Upon derivation of SK_d, MN 110 and HA 180 have established the desired child SA. This SA is used to secure subsequent communications, e.g., the BU/BA messages of step 428, between MN 110 and HA 180.

Several prior-art 3GPP2 documents, e.g., X.S0047, "Mobile IPv6 Enhancement", the 3GPP2 TSG-S WG-4 contribution "S40-20070514-007R1_QCOM-KDDI-Starent-NEC-Futjisu-Hitachi-CTC_WLAN_IW_for_2G_R-UIM-.doc", describe a method that requires executing the EAP protocol within the IKEv.2 procedure, between phases 1 and 2. This executed EAP (specifically EAP-AKA) generates the MSK key, which is used by the IKEv.2 phase 2 for creating the child SA. Such recommended methods practically duplicate the EAP procedure already executed before the IKEv2 phase 1 has even begun, and add unnecessary complications and at least six extra messages to the process. Advantageously over the prior art, a representative embodiment of method 400 utilizes EMSK-based keying material already available from the access-layer SA, without such duplication.

In one embodiment, method 400 can be used to bootstrap an access-layer SA and IPSec SAs for Proxy Mobile IPv6 procedures. For example, a proxy mobile node (P-MN) can be established for MN 110 at an access node (e.g., BTS 120 or PDSN 140). The P-MN, which advantageously resides in the network, can then perform MIPv6 mobility management procedures on behalf of MN 110. In this context, in addition to link authentication and distribution of the MSK to the access node, AAA server 160 will also deliver a derived key (MIP_IKE) to the P-MN to enable it to execute the bootstrapping procedure of method 400.

In another embodiment, MN 110 can use a derived key (MIP_IKE) and the corresponding security parameter index (SPIm) to establish a bootstrap of a network-layer SA or a transport-layer SA with a proxy Session Initiation Protocol (SIP) registration server for non-IMS applications, where IMS refers to a service architecture known as IP Multimedia Subsystem, as standardized by the 3GPP family of standards (see, e.g., the Multimedia Domain for 3GPP2). While the IMS is a general framework for providing call and session control for a variety of IP services, network operators continue to be interested in the inclusion non-IMS services as well.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer or processor, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

We claim:

1. A method of establishing secure communications between two or more nodes of a network, comprising:
   establishing a first security association (SA) between a client and a network server, the first SA being an access-layer SA;
   at each of the client and the network server, deriving a secondary key from a key corresponding to the first SA;
   at a first network node, obtaining the secondary key from the network server;
   establishing a second SA between the first network node and the client using the secondary key, wherein the step of establishing the second SA comprises:
      executing a key exchange protocol between the first network node and the client to generate a seed key at each of the client and the first network node, wherein, at the first network node, the seed key is generated prior to the step of obtaining the secondary key from the network server;
      at the first network node,
         authenticating identity of the client upon receiving from the client a message having a first payload signed with the secondary key and by verifying the first payload using the secondary key;
         upon successful verification of the first payload using the secondary key, sending to the client a message having a second payload signed with the secondary key to enable the client to authenticate identity of the first network node by verifying the second payload using the secondary key; and
         deriving a session key for the second SA from the seed key; and
      at the client, deriving the session key from the seed key upon successful verification of the second payload using the secondary key; and
   securing one or more messages transmitted between the first network node and the client using said session key.

2. The method of claim 1, wherein the second SA corresponds to a stack layer higher than the access layer.

3. The method of claim 1, wherein the step of establishing the first SA comprises authorizing the client at the network server for entering into security associations.

4. The method of claim 1, wherein the client is a mobile node connected to the network via a wireless link.

5. The method of claim 1, wherein the step of deriving the secondary key comprises:
   calculating a primary session key, wherein the primary session key corresponds to the first SA;
   deriving the secondary key from the primary session key; and
   deriving a security parameter index (SPI) corresponding to the secondary key from the primary session key.

6. The method of claim 5, wherein the step of obtaining comprises, at the first network node:
receiving from the client a first message containing the client's identity and the SPI;
sending to the network server a second message (i) containing the client's identity and the SPI and (ii) requesting the secondary key from the network server; and
receiving from the network server a third message containing the secondary key.

7. The method of claim 1, wherein the second SA is established to execute a Mobile Internet Protocol.

8. The method of claim 7, wherein the step of establishing the first SA comprises, at the network server, executing a full Extensible Authentication Procedure (EAP) with the client.

9. The method of claim 7, wherein the step of deriving the secondary key comprises:
calculating an extended master session key (EMSK) corresponding to the first SA;
deriving the secondary key from the EMSK; and
deriving a security parameter index (SPI) corresponding to the secondary key from the EMSK.

10. The method of claim 9, wherein the method further comprises, at the client:
obtaining an IP address of the first network node from the network server, said IP address serving as a network-layer identity for the first network node; and
computing a co-located care-of address (CoA) serving as a network-layer identity of the client.

11. The method of claim 7, further comprising transmitting binding updates and binding acknowledgements between the client and the first network node to maintain the second SA.

12. The method of claim 1, wherein the first network node does not have said key corresponding to the first SA.

13. A method of establishing secure communications between two or more nodes of a network, comprising:
establishing a first security association (SA) between a client and a network server, the first SA being an access-layer SA;
at each of the client and the network server, deriving a secondary key from a key corresponding to the first SA;
at a first network node, obtaining the secondary key from the network server; and
establishing a second SA between the first network node and the client using the secondary key, wherein the step of establishing the second SA comprises:
executing a key exchange protocol between the first network node and the client to generate a seed key; and
at the first network node, deriving a session key for the second SA from the secondary key and the seed key, wherein the secondary key serves as a root key for the derivation of said session key;
wherein the second SA is established to execute a Mobile Internet Protocol;
wherein the step of deriving the secondary key comprises:
calculating an extended master session key (EMSK) corresponding to the first SA;
deriving the secondary key from the EMSK; and
deriving a security parameter index (SPI) corresponding to the secondary key from the EMSK;
wherein the method further comprises, at the client:
obtaining an IP address of the first network node from the network server, said IP address serving as a network-layer identity for the first network node; and
computing a co-located care-of address (CoA) serving as a network-layer identity of the client; and
wherein the method further comprises, at the first network node:
receiving from the client a first message containing an SPI pointer selected by the client, the CoA, a payload specifying cryptographic algorithms supported by the client, and a first nonce;
sending to the client a second message containing a payload specifying a subset of the cryptographic algorithms and the SPI pointer, wherein the SPI comprises a concatenation of the SPI pointer selected by the client and a random number selected by the first network node;
generating a first plurality of keys, which includes the seed key, for encryption and integrity protection of further negotiation messages between the client and the first network node, said negotiation directed at the establishment of the second SA;
receiving from the client a third message being one of said negotiation messages and containing a Network Access Identifier (NAI) of the client, a proof of knowledge of a secret corresponding to the NAI, and one or more traffic selectors;
sending to the network server a fourth message (i) containing the SPI and the NAI and (ii) requesting the secondary key from the network server;
receiving from the network server a fifth message containing the secondary key; and
sending to the client a sixth message containing an acknowledgement of the receipt of the secondary key from the network server.

* * * * *